United States Patent [19]
Kim et al.

[11] 3,759,922
[45] Sept. 18, 1973

[54] PREPARATION OF PYRIMIDO(5,4-C)(1,5) BENZ OXAZEPIN-5(11H)-ONES AND INTERMEDIATES

[75] Inventors: Dong H. Kim, Wayne; Arthur A. Santilli, Havertown, both of Pa.

[73] Assignee: American Home Products Corporation, New York, N.Y.

[22] Filed: June 25, 1971

[21] Appl. No.: 156,941

[52] U.S. Cl. 260/256.4 F, 260/256.4 C, 260/256.4 N, 424/251
[51] Int. Cl............................................. C07d 99/10
[58] Field of Search............................... 260/256.4 F

[56] References Cited
UNITED STATES PATENTS
3,594,372   7/1971   Santilli et al. ................ 260/256.4 F Primary Examiner—Richard J. Gallagher
Attorney—Vito Victor Bellino et al.

[57] ABSTRACT

The disclosure is directed to the method of preparing and the resultant products of pyrimido[5,4-c][1,5]-benzoxazepin-5(11H)-ones and intermediates having the general formulae:

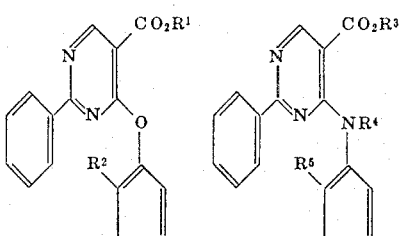

(I)     (II)

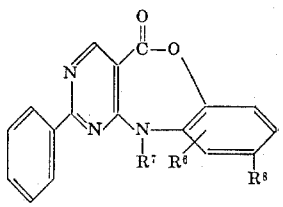

(III)

where $R^1$–$R^8$ are as defined below. The products are prepared by a series of reactions involving first reacting 5-carbethoxy-4-chloro-2-phenyl pyrimidine with o-nitrophenol, catalytically reducing, and then hydrolizing the product, and finally treating the reduced carboxylic acid product with an acid anhydride. The final products are pharmacodynamically active, particularly as central nervous system depressants. That is, the products produce a calming effect in the host, inter alia.

5 Claims, No Drawings

PREPARATION OF PYRIMIDO(5,4-C)(1,5) BENZ OXAZEPIN-5(11H)-ONES AND INTERMEDIATES

This invention relates generally to the preparation of pyrimidobenzoxazepinones and to intermediates in their preparation. The invention is particularly directed to compounds having the structural formulae:

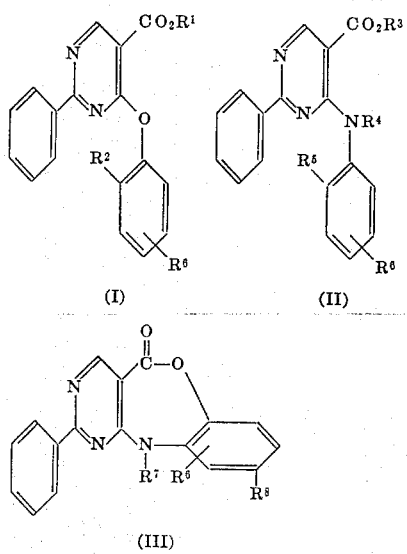

where
$R^1$ is hydrogen or lower alkyl;
$R^2$ is hydrogen, nitro, amino, or lower alkylamino;
$R^3$ is hydrogen or lower alkyl;
$R^4$ is hydrogen or lower alkyl;
$R^5$ is hydroxy, lower alkoxy, or lower alkanoyl;
$R^6$ is hydrogen, halogen, or nitro;
$R^7$ is lower alkyl or lower alkanoyl; and
$R^8$ is hydrogen, halogen or nitro.

As defined herein, the terms "lower alkyl," "lower alkoxy," "lower alkanoyl," and the like, describe groups having from one to four carbon atoms in a straight or branched chain.

A typical example of the compounds of this invention which are depicted by structural formula (I) is 4-(o-nitrophenoxy)-2-phenyl-5-pyrimidinecarboxylic acid, ethyl ester.

A typical example of the compounds of this invention which are depicted by structural formula (II) is 4-(o-hydroxyanilino)-2-phenyl-5-pyrimidinecarboxylic acid.

A typical example of the compounds of this invention which are depicted by structural formula (III) is N-ethyl-2-phenylpyrimido[5,4-c][1,5]benzoxazepin-5-(11H)-one.

The new and useful compounds of this invention may be prepared by the process which is hereinafter schematically illustrated, $R^1$–$R^5$ being defined as described above:

REACTION SCHEME I

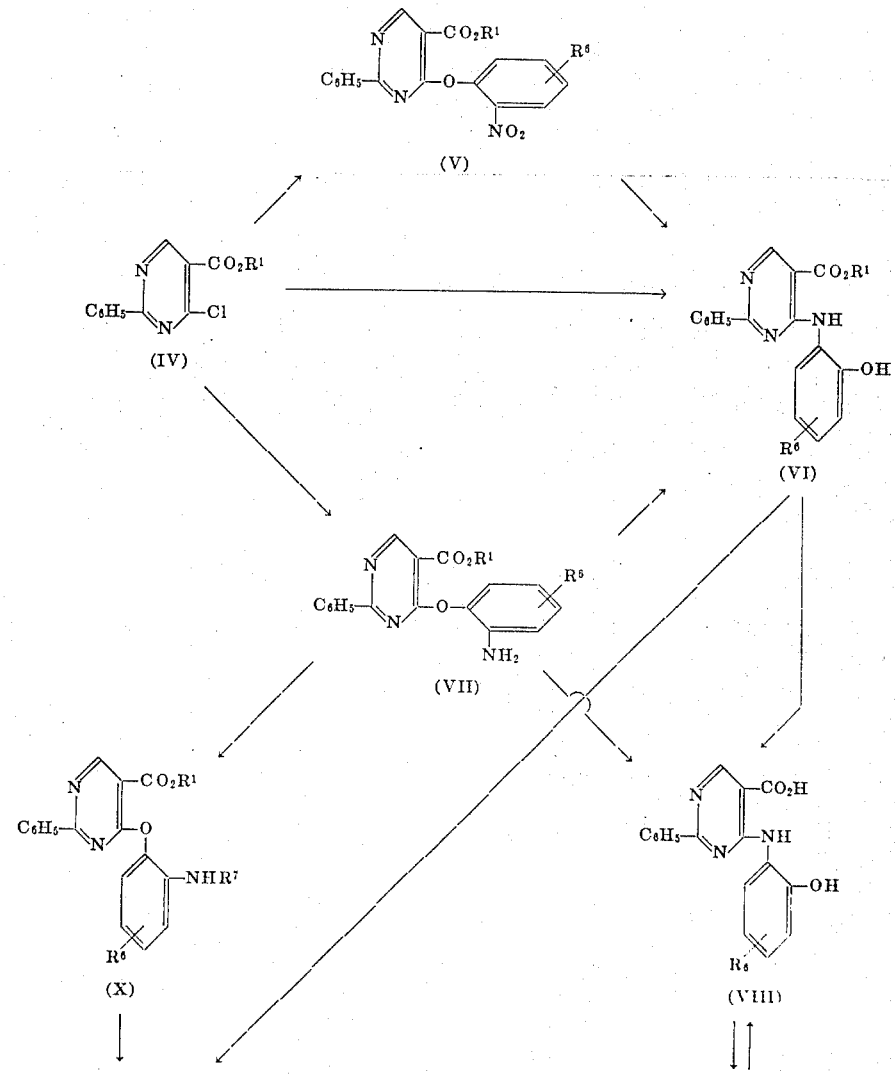

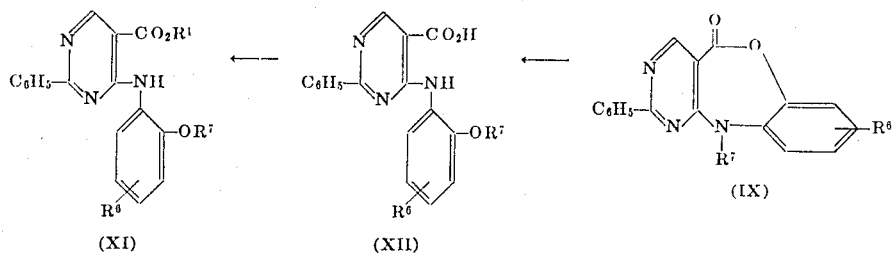

An alternate method for the preparation of the new and useful products of this invention is hereinafter schematically illustrated, $R^1$-$R^8$ being defined as described above.

REACTION SCHEME II

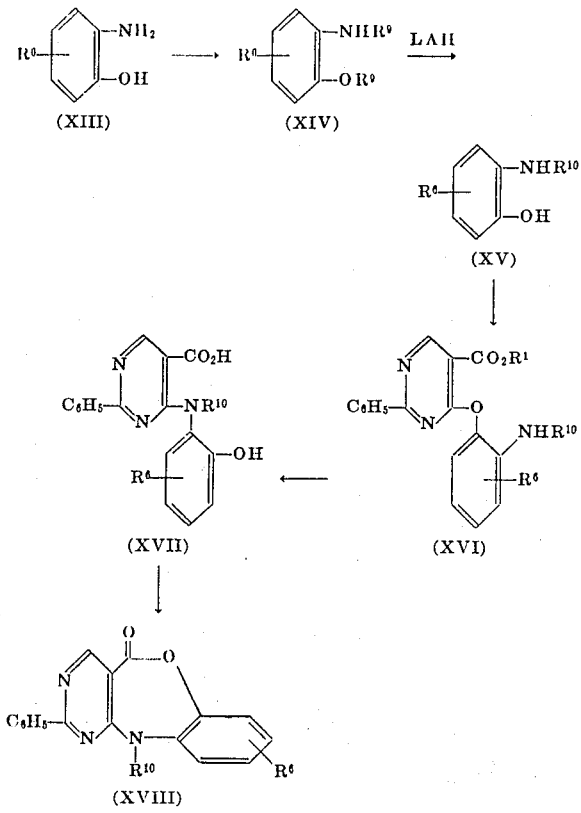

Where
$R^9$ is lower alkanoyl, and
$R^{10}$ is lower alkyl.

When $R^7$ is ethyl and $R^{10}$ is n-propyl, an alternative synthetic scheme, Reaction Scheme III, as outlined hereinafter was employed $R^1 - R^8$ being defined as described above.

where
$R^{11}$ is hydrogen or lower alkyl
$R^{12}$ is lower alkyl.

The starting materials used in the preparation of the compounds of this invention are generally known and can be prepared by well-known procedures.

As is shown in Reaction Scheme I the intermediate products of the invention may be prepared by a number of methods.

Method 1

In a first method 5-carbethoxy-4-chloro-2-phenylpyrimidine (IV) is reacted with o-nitrophenol affording 4-(o-nitrophenoxy)-2-phenyl-5-pyrimidinecarboxylic acid, ethyl ester (V) which may be catalytically reduced to afford 4-(o-hydroxyanilino)-2-phenyl-5-pyrimidinecarboxylic acid, ethyl ester (VI).

Method 2

In an alternate method 5-carbethoxy-4-chloro-2-phenylpyrimidine (IV) may be refluxed with o-aminophenol to directly afford 4-(o-hydroxyanilino)-2-phenyl-5-pyrimidinecarboxylic acid, ethyl ester (VI). It has been found that in carrying out the latter method, there is produced an intermediate 4-(2-aminophenoxy)-2-phenyl-5-pyrimidinecarboxylic acid, ethyl ester (VII) which readily rearranges to afford 4-(o-hydroxyanilino)-2-phenyl-5-pyrimidinecarboxylic acid, ethyl ester (VI).

Referring to Reaction Scheme 1, refluxing for 1 to 5 hours, a mixture of 4-(o-hydroxyanilino)-2-phenyl-5-pyrimidinecarboxylic acid, ethyl ester (VI), 40 percent aqueous potassium hydroxide and ethanol, followed by chilling of the reaction mixture, filtration, dissolving the precipitate in hot water, and acidification affords the product 4-(o-hydroxyanilino)-2-phenyl-5-pyrimidinecarboxylic acid (VIII).

As an alternative, 4-(o-hydroxyanilino)-2-phenyl-5-pyrimidinecarboxylic acid (VIII) may be prepared by refluxing a mixture of 4-(2-aminophenoxy)-2-phenyl-5-pyrimidinecarboxylic acid, ethyl ester (VII), 15 percent aqueous sodium hydroxide solution and ethanol for about 1 to 3 hours. Acidification of the reaction mixture, for instance with hydrochloric acid to about

REACTION SCHEME III

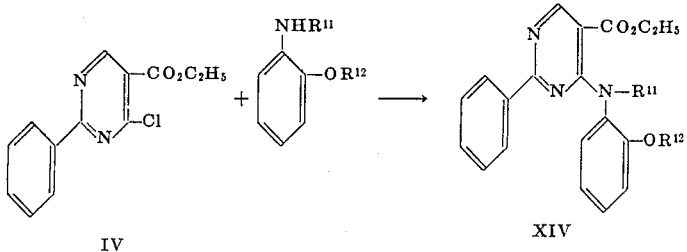

pH 2, affords the product as a precipitate which may collected and purified, for instance by filtration and washing with water.

A mixture of 4-(o-hydroxyanilino)-2-phenyl-5-pyrimidinecarboxylic acid (VIII) and acetic anhydride is heated to reflux temperatures and a clear solution is obtained in 5 to 30 minutes. Refluxing is continued for 15 to 75 minutes then the excess acetic anhydride is removed under reduced pressure. On chilling, the residue solidifies to afford the product 11-acetyl-2-phenylpyrimido[5,4-c][1,5]benzoxazepin-5(11H)-one (IX).

To a pyridine solution containing 4-(2-aminophenoxy)-2-phenyl-5-pyrimidinecarboxylic acid, ethyl ester (VII) is added drop-wise acetic anhydride under chilling. Chilling and stirring are continued for 0.5 to 2 hours until a precipitate deposits. The precipitate is collected by filtration and washed with water to afford the product 4-(2-N-acetylaminophenoxy)-2-phenyl-5-pyrimidinecarboxylic acid, ethyl ester (X).

A mixture of 11-acetyl-2-phenylpyrimido[5,4-c][1,5]-benzoxazepin-5(11H)-one (IX), absolute ethanol and concentrated hydrochloric acid is stirred at room temperature for 10 to 30 minutes and chilled in an ice bucket. The precipitate is collected on a filter and washed with ethanol, then with water, and the product recrystallized from dimethylformamide, affording the product 4-(o-hydroxyanilino)-2-phenyl-5-pyrimidinecarboxylic acid, acetate (XII).

To a pyrimidine solution of 4-(5-chloro-2-hydroxyanilino)-2-phenyl-5-pyrimidinecarboxylic acid, ethyl ester (VI) is added drop-wise acetic anhydride and the resultant mixture refluxed for 15 minutes to 1 hour. Chilling of the reaction mixture causes separation of the precipitate which is collected on a filter and washed with ethanol to afford the product. Recrystallization from pyridine purifies the product 4-(3-chloro-6-hydroxyanilino)-2-phenyl-5-pyrimidinecarboxylic acid, ethyl ester, acetate (XI).

A mixture of 4-(2-N-acetylaminophenoxy)-2-phenyl-5-pyrimidinecarboxylic acid, ethyl ester (x) and pyridine is refluxed for 1 to 4 hours and then the excess pyridine is removed under reduced pressure to yield an oil which crystallizes on chilling. The product is 4-(3-chloro-6-hydroxyanilino)-2-phenyl-5-pyrimidinecarboxylic acid, ethyl ester, acetate (XI).

The pyrimido [5,4-c][1,5]benzoxazepin-5-(11H)-ones, in which $R^{10}$ is ethyl, n-propyl or n-butyl, may be prepared as shown in Reaction Scheme II. To a pyridine solution containing o-aminophenol (XIII) is added slowly acetic anhydride whereby an exothermic reaction takes place. When the reaction has subsided, the reaction mixture is heated on a steam bath for 10 to 60 minutes, then chilled in a freezer. The precipitate thus separated is collected on a filter and washed with water to yield the product o-N-acetylaminophenol, acetate (XIV). The product o-N-acetylaminophenol, acetate (XIV) is dissolved in tetrahydrofuran and is added drop-wise to a suspension of lithium aluminum hydride in tetrahydrofuran. The resulting mixture is stirred at room temperature for 0.5 to 4 hours, then contacted with water, 15 percent sodium hydroxide, and water successively. After removing the inorganic salt by filtration, the tetrahydrofuran is evaporated under reduced pressure. Acidification of the residue, for instance with the 3 normal hydrochloric acid, causes separation of a precipitate which is collected on a filter under a nitrogen atmosphere as the product 2-N-ethylaminophenol (XV). To the product 2-N-ethylaminophenol (XV) in ethanolic solution is added in small portions 5-carbethoxy-4-chloro-2-phenylpyrimidine (IV) with warming on a steam bath. The resulting mixture is refluxed for 15 to 90 minutes. Addition of a large amount of water causes separation of a precipitate which is collected, for instance on a filter, and washed with water, then with ether, to yield the product 4-(o-ethylaminophenoxy)-2-phenyl-5-pyrimidinecarboxylic acid, ethyl ester (XVI).

A mixture of 4-(o-ethylaminophenoxy)-2-phenyl-5-pyrimidinecarboxylic acid, ethyl ester (XVI), 15 percent aqueous sodium hydroxide solution and ethanol is refluxed for 0.5 to 3 hours then acidified, for instance with dilute hydrochloric acid, to a pH of about 2. The precipitate thus deposited is collected on a filter and washed with ethanol then with water to yield a product which is 4-(N-ethyl-o-hydroxyanilino)-2-phenyl-5-pyrimidinecarboxylic acid (XVII). The product may be purified by recrystallization from ethanol or water if desired.

A mixture of 4-(N-ethyl-o-hydroxyanilino)-2-phenyl-5-pyrimidinecarboxylic acid (XVII) and acetic anhydride is refluxed for 1 to 5 hours. Removal of the excess acetic anhydride under reduced pressure affords an oil which solidifies on standing to yield the product 11-ethyl-2-phenylpyrimido-[5,4-c][1,5]benzoxazepin-5-(11H)-one (XVIII) which may be purified by recrystallization from absolute ethanol.

Compounds of structure XIX were prepared, as shown in the reaction scheme III, by heating a mixture of 4-chloro-2-phenyl-5-pyrimidinecarboxylic acid, ethyl ester, sodium carbonate, an appropriate aniline, and ethanol (reaction solvent) under reflux for 1 to 2 hrs, then working up the reaction mixture by a standard procedure.

In the pharmacological evaluation of the biological activity of the compounds of this invention, the in vivo effects are tested as follows. The compound is administered intraperitoneally to three mice (14 to 24 grams) at each of the following doses: 400, 127, 40 and 12.7 mg./kg. The animals are watched for a minimum of 2 hours during which time signs of general stimulation, (i.e., increased spontaneous motor activity hyperactivity on tactile stimulation, twitching), general depression (i.e., decreased spontaneous motor activity, decreased respiration) autonomic activity (i. e., miosis, mydriasis, diarrhea) are noted.

When evaluated in the foregoing pharmacological procedure the compounds of this invention produced decreased motor activity and decreased respiration at a dose of 12.7 to 400 MPK, which is proof of central nervous system depressant activity. While some compounds showed no CNS depressant activity at the maximum dose tested, it is believed that all would show such activity at higher dose ranges. None of the compounds were toxic at the highest dose tested.

When the compounds of this invention are employed as described above, they may be administered alone or in combination with pharmaceutically acceptable carriers, the proportions of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, the treatment is initiated with small doses substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

For brevity the following abbreviations are used in the examples: "g" for gram or grams, "ml" for milliliter or milliliters, "hr" for hour or hours, "°" for degrees centigrade, "mp" for melting point, "$\phi$" for phenyl or —$C_6H_5$, "dec." for decomposed, and MPK for milligrams per kilogram of host body weight.

EXAMPLE 1

The following exemplifies the preparation of 4-(o-nitrophenoxy)-2-phenyl-5-pyrimidinecarboxylic acid, ethyl ester, a compound of structure V.

o-Nitrophenol (14 g) was added to a sodium methoxide-methanol solution obtained by dissolving 2.3 g of sodium in 70 ml of absolute methanol whereby a dark red color developed. After removing the methanol under reduced pressure, 70 ml of dimethylformamide and 26.3 g of 4-chloro-5-carbethoxy-2-phenylpyrimidine were added, and the mixtures was refluxed for 1 hr. The hot reaction mixture was filtered and the filtrate was chilled in ice to cause precipitation of product. The product weighed 29 g and melted at 150°–154°. Recrystallization of the product from absolute ethanol afforded an analytical sample, mp 151°–154°.

Based on the assumed molecular formula $C_{19}H_{15}N_3O_2$ it was calculated that the elemental analysis by weight would be 62.46 percent carbon, 4.14 percent hydrogen and 11.50 percent nitrogen. The product was analyzed and found to contain 62.33 percent carbon, 4.09 percent hydrogen, and 11.36 percent nitrogen which confirmed the accuracy of the assumed formula. This may be expressed:

Anal. Calcd for $C_{19}H_{15}N_3O_2$: C, 62.46; H, 4.14; N, 11.50.

Found: C, 62.33; H, 4.09; N, 11.36.

When evaluated in the foregoing pharmacological procedure the latter compound was found to be a mydriatic agent at a dose of 400 MPK.

Following the procedure of Example 1, but substituting appropriate starting materials, products having the following substituents may be prepared.

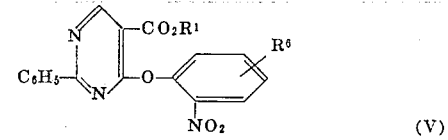

(V)

| | $R^1$ | $R^6$ |
|---|---|---|
| Example 1-A | $C_2H_5$ | H |
| -B | $CH_3$ | H |
| -C | $C_3H_7$ | H |
| -D | $C_4H_9$ | H |
| -E | i-$C_3H_7$ | H |
| -F | t-$C_4H_9$ | H |
| -G | $C_2H_5$ | Cl |
| -H | $C_2H_5$ | Br |
| -I | $C_2H_5$ | F |
| -J | $C_2H_5$ | I |
| -K | $CH_3$ | Cl |
| -L | $C_3H_7$ | Cl |
| -M | $C_4H_9$ | Cl |
| -N | $C_3H_7$ | F |
| -O | $C_4H_9$ | I |

EXAMPLE 2

The following exemplifies the preparation of 4-(o-hydroxyanilino)-2-phenyl-5-pyrimidinecarboxylic acid, ethyl ester, a compound of structure VI.

A mixture obtained by dissolving 2.0 g of 4-(o-nitrophenoxy)-2-phenyl-5-pyrimidinecarboxylic acid, ethyl ester (V) and 0.5 g of Palladium Charcoal in 200 ml of absolute ethanol was reduced catalytically at 50° over a period of 75 min. After removing the catalyst by filtration, the ethanolic solution was concentrated to about 60 ml, and chilled in an ice-bucket. The product was collected by filtration, then recrystallized from absolute ethanol, mp 178.5°–181°, yield 1.8 g.

Anal. Calcd for $C_{19}H_{17}N_3O_3$: C, 68.05; H, 5.11; N, 12.53.

Found: C, 68.33; H, 4.81; N, 12.70.

Following the procedure of Example 2, but substituting appropriate starting materials, products having the following substitutents may be prepared.

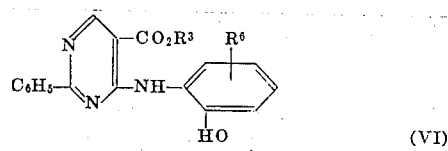

(VI)

| | $R^3$ | $R^6$ |
|---|---|---|
| Example 2-A | $C_2H_5$ | H |
| B | $CH_3$ | H |
| C | $C_3H_7$ | H |
| D | $C_4H_9$ | H |
| E | i-$C_3H_7$ | H |
| F | t-$C_4H_9$ | H |
| G | $C_2H_5$ | Cl |
| H | $C_2H_5$ | Br |
| I | $C_2H_5$ | F |
| J | $C_2H_5$ | I |
| K | $CH_3$ | Cl |
| L | $C_3H_7$ | Cl |
| M | $C_4H_9$ | Cl |
| N | $C_3H_7$ | F |
| O | $C_4H_9$ | I |

EXAMPLE 3

The following exemplifies the preparation of 4-(o-hydroxyanilino)-2-phenyl-5-pyrimidinecarboxylic acid, ethyl ester, a compound of structure VI.

I. o-Aminophenol (3.3 g) was added to 50 ml of absolute methanol containing 0.7 g of sodium, then the methanol was removed in vacuo to give sodium salt of the o-aminophenol. Dimethylformamide was added to the reaction flask. To this solution was added 5-carbethoxy-4-chloro-2-phenylpyrimidine (7.9 g). An exothermic reaction takes place. The reaction mixture was stirred at room temperature for 0.5 hr, then poured into a large amount of ice water which caused separation of the product, mp 178°–181°.

II. In an alternate method of preparation, to a mixture containing 2.2 g of o-aminophenol and 0.46 g of sodium in 45 ml of ethanol was added 5-carbethoxy-4-chloro-2-phenylpyrimidine. The resulting mixture was refluxed for 1 hr. Chilling of the reaction mixture caused separation of product which was collected on a filter, mp 170°–173°; yield 4.5 g. Recrystallization from ethanol raised the mp to 178°–181°.

Following the procedure of Example 3, but substituting appropriate starting materials, products having the following substituents may be prepared.

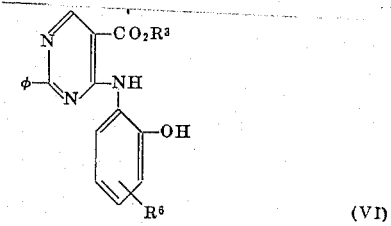

(VI)

| Example 3-A | $R^3$ | $R^6$ |
|---|---|---|
| A | $C_2H_5$ | H |
| B | $CH_3$ | H |
| C | $C_3H_7$ | H |
| D | $C_4H_9$ | H |
| E | $i\text{-}C_3H_7$ | H |
| F | $t\text{-}C_4H_9$ | H |
| G | $C_2H_5$ | Cl |
| H | $C_2H_5$ | Br |
| I | $C_2H_5$ | F |
| J | $C_2H_5$ | I |
| K | $CH_3$ | Cl |
| L | $C_3H_7$ | Cl |
| M | $C_4H_9$ | Cl |
| N | $C_3H_7$ | F |
| O | $C_4H_9$ | I |

EXAMPLE 4

The following exemplfiies the preparation of 4-(5-chloro-2-hydroxyanilino)-2-phenyl-5-pyrimidinecarboxylic acid, ethyl ester, a compound of structure VI.

To a mixture containing 7.0 g of 2-amino-4-chlorophenol and 1.2 of sodium in 300 ml of absolute thanol was added 13.0g of 5-carbethoxy-4-chloro-2-phenylpyrimidine. The resulting mixture was refluxed for 2 hr., then chilled. A precipitate was collected on a filter and washed with ethanol several times then with water to give 13.6 g of product, mp 247°–251°.

This compound is identical with the product obtained by Example 8.

When tested in the foregoing pharmacological evaluation, the latter compound caused decreased motor activity at a dose of 127.MPK administered orally and decreased respiration at a dose of 127 MPK administered orally.

Following the procedure of Example 4, but substituting appropriate starting materials, products having the following substituents may be prepared.

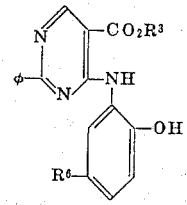

(VI)

| Example 4-A | $R^3$ | $R^6$ |
|---|---|---|
| A | $C_2H_5$ | H |
| B | $CH_3$ | H |
| C | $C_3H_7$ | H |
| D | $C_4H_9$ | H |
| E | $i\text{-}C_3H_7$ | H |
| F | $t\text{-}C_4H_9$ | H |
| G | $C_2H_5$ | Cl |
| H | $C_2H_5$ | Br |
| I | $C_2H_5$ | F |
| J | $C_2H_5$ | I |
| K | $C_3$ | Cl |
| L | $C_3H_7$ | Cl |
| M | $C_4H_9$ | Cl |
| N | $C_3H_7$ | F |
| O | $C_4H_9$ | I |

EXAMPLE 5

The following exemplifies the preparation of 4-(2-hydroxy-5-nitroanilino)-2-phenyl-5-pyrimidinecarboxylic acid, ethyl ester, a compound of structure VI.

I. 2-Amino-4-nitrophenol (7.5 g) was added to 70 ml of methanol containing 1.2 g of sodium. Removal of the methanol from the resulting solution in vacuo afforded sodium salt of the 2-amino-4-nitrophenol which was then dissolved in 5.0 ml of dimethylformamide. To the resulting solution was added 13.0 g of 4-carbethoxy-4-chloro-2-phenylpyrimidine, and stirred at room temperature for 0.5 hr. The reactiom mixture was then warmed on a steam bath for 15 min., then poured into a large amount of cold water. A precipitate thus deposited was collected on a filter and washed with water several times. Recrystallization of the residue on the filter from dimethylformamide afforded 10 g of product, mp 277°–279° dec. Another recrystallization from dimethylformamide raised the mp to 285°–286° dec.
Anal. Calcd for $C_{19}H_{16}N_4O_5$: C, 59.99; H, 4.24; N, 14.73.
Found: C, 59.87; H, 4.32; N, 14.50.

II. This compound can also be prepared from the 5-carbethoxy-4-chloro-2-phenypyrimidine and 2-amino-4-nitrophenol using ethanol as a reaction solvent as described in the preparation of 4-(5-chloro-2-hydroxyanilino)-2-phenyl-5-pyrimidine-carboxylic acid, ethyl ester.

Following the procedure of Example 5, but substituting appropriate starting materials, products having the following substituents may be prepared.

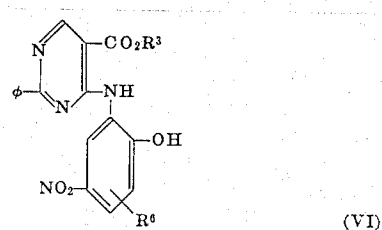

(VI)

|            | R³      | R⁶ |
|------------|---------|----|
| Example 5-A | C₂H₅   | H  |
| B          | CH₃     | H  |
| C          | C₃H₇    | H  |
| D          | C₄H₉    | H  |
| E          | i-C₃H₇  | H  |
| F          | t-C₄H₉  | H  |
| G          | C₂H₅    | Cl |
| H          | C₂H₅    | Br |
| I          | C₂H₅    | F  |
| J          | C₂H₅    | I  |
| K          | CH₃     | Cl |
| L          | C₃H₇    | Cl |
| M          | C₄H₉    | Cl |
| N          | C₃H₇    | F  |
| O          | C₄H₉    | I  |

EXAMPLE 6

The following exemplifies the preparation of 4-(2-aminophenoxy)-2-phenyl-5-pyrimidinecarboxylic acid, ethyl ester, a compound of structure VII.

o-Aminophenol (3.3 g) was added to 50 ml of absolute methanol containing 0.7 g of sodium. After stirring the resulting solution for a few min. the methanol was removed in vacuo to give sodium salt of the o-aminophenol. The salt was dissolved in 70 ml of dimethylformamide. To the resulting solution was added in small portions 7.9 g of 5-carbethoxy-4-chloro-2-phenylpyrimidine under cooling in ice. The cooling and stirring was continued for 15 more min. Pouring of the reaction mixture into a large amount of cold water caused separation of an oil which solidified on scratching. The solid material was collected on a filter and a fractional recrystallization from ether under dry ice-isopropanol chilling separated into two fractions. Another recrystallization of the more soluble fraction from ether afforded the product which melted at 102° solidified then remelted at 173°–175°.

Anal. Calcd. for $C_{19}H_{17}N_3O_3$: C, 68.05; H, 5.11; N, 12.53.

Found: C, 68.05; H, 5.11; N, 12.24.

Following the procedure of Example 6, but substituting appropriate starting materials, products having the following substituents may be prepared.

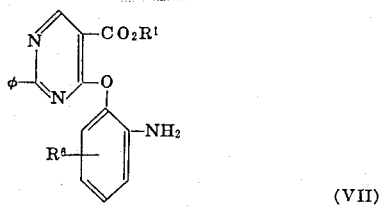

(VII)

|            | R¹      | R⁶ |
|------------|---------|----|
| Example 6-A | C₂H₅   | H  |
| B          | CH₃     | H  |
| C          | C₃H₇    | H  |
| D          | C₄H₉    | H  |
| E          | i-C₃H₇  | H  |
| F          | t-C₄H₉  | H  |
| G          | C₂H₅    | Cl |
| H          | C₂H₅    | Br |
| I          | C₂H₅    | F  |
| J          | C₂H₅    | I  |
| K          | CH₃     | Cl |
| L          | C₃H₇    | Cl |
| M          | C₄H₉    | Cl |
| N          | C₃H₇    | F  |
| O          | C₄H₉    | I  |

EXAMPLE 7

The following exemplfies the preparation of 4-(2-amino-4-chlorophenoxy)-2-phenyl-5-pyrimidinecarboxylic acid, ethyl ester, a compound of structure VII.

The title compound was prepared as in Example 6 from 2-amino-4-chlorophenol and 5-carbethoxy-4-chloro-2-phenylpyrimidine, and crude product was recrystallized from absolute ethanol, mp 144°–146° (solidified and remelted at 246°–250°).

Anal. Calcd for $C_{19}H_{16}ClN_3O_3$: C, 61.71; H, 4.36; N, 11.36; Cl, 9.59.

Found: C, 61.78; H, 4.41; N, 11.34; Cl, 9.45.

EXAMPLE 8

The following exemplifies the preparation of 4-(5-chloro-2-hydroxyanilino)-2-phenyl-5-pyrimidinecarboxylic acid, ethyl ester, a compound of structure VI.

4-(2-Amino-4-chlorophenoxy)-2-phenyl-5-pyrimidinecarboxylic acid, ethyl ester (10 g) in a test tube was immersed in an oil bath maintaining temperature of 180°. The temperature was raised to ca. 210° and kept for 20 min. After cooling to room temperature, the solid was recrystallized from dimethylformamide to give 1.0 g. of product, mp 251°–253°.

Anal. Calcd for $C_{19}H_{16}ClN_3O_3$: C, 61.71; H, 4.36; N, 11.36; Cl, 9.59.

Found: C, 61.38; H, 4.49; N, 11.54; Cl, 9.30.

EXAMPLE 9

The following exemplifies the preparation of 4-(2-hydroxyanilino)-2-phenyl-5-pyrimidinecarboxylic acid, ethyl ester, a compound of structure VI.

The title compound was prepared as in Example 8 from 4-(2-aminophenoxy)-2-phenyl-5-pyrimidinecarboxylic acid, mp 178°–181°.

EXAMPLE 10

The following exemplifies the preparation of 4-(o-hydroxyanilino)-2-phenyl-5-pyrimidinecarboxylic acid, a compound of structure VIII.

A. A mixture of 4-(o-hydroxyanilino)-2-phenyl-5-pyrimidinecarboxylic acid, ethyl ester (VI) (3.2 g), 40 percent aqueous potassium hydroxide (10 ml) and ethanol (20 ml) was refluxed for 2.5 hr. Chilling the reaction mixture caused precipitation of the sodium salt of the product which was collected on a filter. The precipitate was dissolved in hot water, and acidified with 3 N hydrochloric acid which caused precipitation of a product. This product was collected on a filter and washed with water. The washed material was dissolved in 0.5 N NaOH, filtered and the filtrate acidified with 1 N HCl to give 2.0 g of product, mp 285°–289° dec.

Anal. Calcd for $C_{17}H_{13}N_3O_3$: C, 66.44; H, 4.26; N, 13.68.

Found: C, 66.51; H, 4.15; N, 13.48.

B. A mixture of 4-(o-anilinophenoxy)-2-phenyl-5-pyrimidinecarboxylic acid, ethyl ester (VII) (0.3 g), 15 percent aqueous NaOH solution (20 ml) and ethanol (3 ml) was refluxed for 2 hr. Acidification of the reaction mixture with 3 N HCl to pH 2 caused separation of a precipitate which was collected on a filter and washed with water several times to give 0.28 g of product, (VIII) mp 290°–292° dec. A mixture mp with a sample prepared from 4-(o-hydroxyanilino)-2-phenyl-5-pyrimidinecarboxylic acid, ethyl ester was not depressed.

C. A mixture of 11-acetyl-2-phenylpyrimido[5,4-c][1,5]benzoxazepin-5(11H)-one (IX) (0.25 g) and 10 percent aqueous NaOH solution (20 ml) was refluxed for 2 hr, then acidified with 3 N HCl. A precipitate was collected on a filter and washed with water several times to give the product, mp 298° dec.

Following the procedure of Example 10, but substituting appropriate starting materials, products having the following substituents may be prepared.

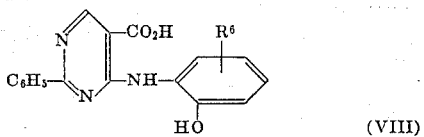

(VIII)

| | R⁶ |
|---|---|
| Example 10-A | H |
| B | Cl |
| C | Br |
| D | F |
| E | I |

EXAMPLE 11

The following exemplifies the preparation of 4-(5-chloro-2-hydroxyanilino)-2-phenyl-5-pyrimidinecarboxylic acid, a compound of structure VIII.

A mixture of 4-(5-chloro-2-hydroxyanilino)-2-phenyl-5-pyrimidinecarboxylic acid, ethyl ester (VI) (10.0 g), 20 percent aqueous NaOH solution (200 ml) and ethanol (10 ml) was refluxed for 20 min, then acidified with dilute HCl. A precipitate separated, was collected on a filter and washed with water several times, mp 295°–297° dec. Purification by base-acid treatment raised the mp to 298°–300° dec.

Anal. Calcd for $C_{17}H_{12}ClN_3O_3$: C, 59.76; H, 3.54; N, 12.30.

Found: C, 59.59; H, 3.58; N, 12.44.

EXAMPLE 12

The following exemplifies the preparation of 4-(2-hydroxy-5-nitroanilino)-2-phenyl-5-pyrimidinecarboxylic acid, a compound of structure VIII.

4-(2-Hydroxy-5-nitroanilino)-2-phenyl-4-pyrimidinecarboxylic acid was prepared from 4-(2-hydroxy-5-nitroanilino)-2-phenyl-5-pyrimidinecarboxylic acid, ethyl ester (VI) by base hydrolysis as in the previous example, mp 330° dec.

Anal. Calcd for $C_{17}H_{12}N_4O_6 \cdot H_2O$: C, 55.13; H, 3.81; N, 15.13.

Found: C, 55.24; H, 3.60; N, 14.88.

Following the procedure of Example 12, but substituting appropriate starting materials, products having the following substituents may be prepared.

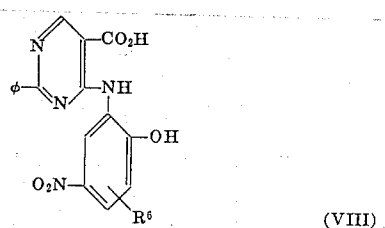

(VIII)

| | R⁶ |
|---|---|
| Example 12-A | H |
| B | Cl |
| C | F |
| D | Br |
| E | I |

EXAMPLE 13

The following exemplifies the preparation of 11-acetyl-2-phenylpyrimido[5,4-c][1,5]benzoxazepin-5(11H)-one, a compound of structure IX.

A mixture of 1.0 g of 4-(o-hydroxyanilino)-2-phenyl-5-pyrimidinecarboxylic acid (VIII) and 25 ml of acetic anhydride was heated to reflux. A clear solution was obtained in 15 min. Refluxing was continued for 45 min, then the excess acetic anhydride was removed under reduced pressure. The residue solidified on chilling to give 0.55 g of product, mp 219°–225°. Recrystallization from acetic anhydride afforded an analytical sample, mp 221°–223.5°.

Anal. Calcd for $C_{19}H_{13}N_3O_3$: C, 68.87; H, 3.96; N, 12.68.

Found: C, 69.08; H, 3.70; N, 12.61.

Following the procedure of Example 13, but substituting appropriate starting materials, products having the following substituents may be prepared.

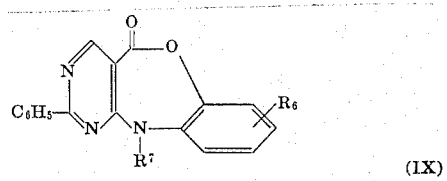

(IX)

| | R⁷ | R⁶ |
|---|---|---|
| Example 13-A | acetyl | H |
| B | propionyl | H |
| C | acetyl | Cl |
| D | butyryl | F |
| E | propionyl | I |

EXAMPLE 14

The following exemplifies the preparation of 11-acetyl-9-chloro-2-phenylpyrimido[5,4-c][1,5]benzoxazepin-5(11H)-one, a compound of structure IX.

A mixture of 4-(2-hydroxy-5-chloroanilino)-2-phenyl-5-pyrimidinecarboxylic acid (VIII) (4.5 g) and acetic anhydride (100 ml) was gently refluxed for 2.5 hr, treated with charcoal, and filtered. Chilling of the filtrate caused separation of a precipitate which was collected on a filter, and dried over KOH in vacuo at 100° to give 1.5 g of product, mp 223°–228°. Recrystallization of the crude product from acetic anhydride raised the mp to 243°–246°.

Anal. Calcd for $C_{19}H_{12}ClN_3O_3$: C, 62.39; H, 3.31; N, 11.49.

Found: C, 62.73; H, 3.20; N, 11.52.

When tested in the foregoing pharmacological evaluation, the latter compound caused decreased motor activity at a dose of 12.7 MPK administered parenterally and decreased respiration at a dose of 12.7 MPK administered parenterally.

EXAMPLE 15

The following exemplifies the preparation of 11-acetyl-9-nitro-2-phenylpyrimido[5,4-c]benzoxazepin-5(11H)-one, a compound of structure IX.

A mixture of 4-(2-hydroxy-5-nitroanilino)-2-phenyl-5-pyrimidinecarboxylic acid (VIII) (1.1 g) and acetic anhydride (25 ml) was refluxed for 1.5 hr. Chilling of the reaction mixture caused separation of a precipitate which was collected on a filter. Repeated recrystallization from acetic anhydride afforded 0.7 g of an analytical sample, mp 284°–285°.

Anal. Calcd for $C_{19}H_{12}N_4O_5$: C, 60.64; H, 3.21; N, 14.89

Found: C, 60.49; H, 3.34; N, 15.06.

Following the procedure of Example 15, but substituting appropriate starting materials, products having the following substituents may be prepared.

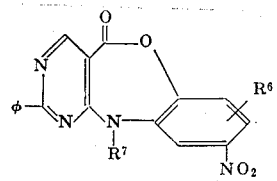

(IX)

|  | $R^7$ | $R^6$ |
|---|---|---|
| Example 15A | acetyl | H |
| B | propionyl | H |
| C | acetyl | Cl |
| D | butyryl | F |
| E | propionyl | I |

EXAMPLE 16

The following exemplifies the preparation of 4-(2-N-acetylaminophenoxy)-2-phenyl-5-pyrimidinecarboxylic acid, ethyl ester, a compound of structure X.

To a pyridine solution containing 4-(o-aminophenoxy)-2-phenyl-5-pyrimidinecarboxylic acid, ethyl ester (VII) (2.0 g) was added dropwise acetic anhydride (1.0 g) under chilling. The chilling and stirring was continued for 1 hr, whereby a precipitate deposited. The precipitate was collected on a filter and washed with water to give 1.7 g of product, mp 140°. Recrystallization from absolute ethanol afforded an analytical sample, mp 138°–140°.

Anal. Calcd for $C_{21}H_{19}N_3O_4$: C, 66.83; H, 5.07; N, 11.14.

Found: C, 66.45; H, 5.00; N, 11.20.

Following the procedure of Example 16, but substituting appropriate starting materials, products having the following substituents may be prepared.

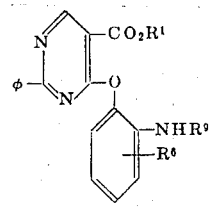

(X)

|  | $R^1$ | $R^6$ | $R^9$ |
|---|---|---|---|
| Example 16-A | $C_2H_5$ | H | acetyl |
| B | $CH_3$ | H | acetyl |
| C | $i$-$C_3H_7$ | H | acetyl |
| D | $C_4H_9$ | H | acetyl |
| E | $t$-$C_4H_9$ | H | acetyl |
| F | $CH_2$ | H | propionyl |
| G | $C_3H_7$ | Cl | butyryl |

EXAMPLE 17

The following exemplifies the preparation of 4-(o-hydroxyanilino)-2-phenyl-5-pyrimidinecarboxylic acid, acetate, a compound of structure XII.

A mixture of 11-acetyl-2-phenylpyrimido[5,4-c][1,5]benzoxapin-5(11H)-one (IX) (0.5 g), absolute ethanol (17 ml) and concentrated HCl (4 drops) was stirred at room temperature for 20 min, then chilled in an ice-bucket. A precipitate was collected on a filter and washed with ethanol then with water. The crude product was then recrystallized from dimethylformamide, mp 232°–234° dec.

Anal. Calcd for $C_{19}H_{15}N_3O_4$: C, 65.32; H, 4.33; N, 12.03.

Found: C, 64.93; H, 4.60; N, 12.28.

Following the procedure of Example 17, but substituting appropriate starting materials, products having the following substituents may be prepared.

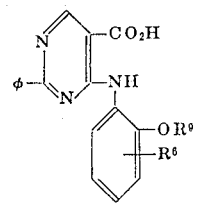

(XII)

|  | $R^6$ | $R^9$ |
|---|---|---|
| Example 17-A | H | acetyl |
| B | H | propionyl |
| C | H | butyryl |
| D | Cl | i-propionyl |
| E | Br | acetyl |

EXAMPLE 18

The following exemplifies the preparation of 4-(o-hydroxyanilino)-2-phenyl-5-pyrimidinecarboxylic acid, ethyl ester, acetate, a compound of structure XI.

A. To a solution obtained by dissolving 1.0 g of 4-(2-hydroxy-anilino)-2-phenyl-5-pyrimidinecarboxylic acid, ethyl ester (VI) in 15 ml of pyridine was added dropwise 0.4 g of acetic anhydride. The resulting mixture was heated on a steam bath for 1 hr. The pyridine was removed under reduced pressure to give a crystalline residue. Recrystallization from cyclohexane afforded an analytical sample, mp 152°–154°; yield 0.5 g.

Anal. Calcd for $C_{21}H_{19}N_3O_4$: C, 66.83; H, 5.07; N, 11.13.

Found: C, 66.75; H, 5.32; N, 11.27.

B. A mixture of 4-(2-N-acetylaminophenoxy)-2-phenyl-5-pyrimidinecarboxylic acid, ethyl ester (X) (0.7 g) and pyridine (25 ml) was refluxed for 3 hr, then the excess pyridine was removed under reduced pressure to give an oil which crystallized on chilling, mp 140°–142.5°. Infrared spectrum of this product is identical with an authentic sample prepared from 4-(2-hydroxyanilino)-2-phenyl-4-pyrimidinecarboxylic acid, ethyl ester and acetic anhydride.

EXAMPLE 19

The following exemplifies the preparation of 4-(3-chloro-6-hydroxyanilino)-2-phenyl-5-pyrimidinecarboxylic acid, ethyl ester, acetate, a compound of structure XI.

A. To a pyridine solution containing 3.7 g of 4-(5-chloro-2-hydroxyanilino)-2-phenyl-5-pyrimidinecarboxylic acid, ethyl ester (VI) was added dropwise 2.0 g of acetic anhydride. The resulting mixture was refluxed for 0.5 hr. Chilling of the reaction mixture caused separation of a precipitate which was collected on a filter and washed with ethanol to give 3.2 g of product, mp 159°–160°. Recrystallization from pyridine raised the mp to 160°–162°.

Anal. Calcd for $C_{21}H_{18}ClN_3O_4$: C, 61.10; H, 4.64; N, 10.18;

Cl, 8.59.

Found: C, 61.17; H, 4.74; N, 10.37; Cl, 8.84.

B. A mixture of 4-(3-chloro-6-hydroxyanilino)-2-phenyl-5-pyrimidinecarboxylic acid, acetate (XI) (0.3 g) and ethyl chloroformate (20 ml) was refluxed overnight. Removal of the excess ethyl chloroformate under reduced pressure afforded a solid residue which was then recrystallized from aniline, mp 144°–145°. Infrared spectrum of this compound is identical with that of 4-(3-chloro-6-hydroxyanilino)-2-phenyl-5-pyrimidinecarboxylic acid, ethyl ester, acetate (XI) prepared from 4-(5-chloro-2-hydroxyanilino)-2-phenyl-5-pyrimidinecarboxylic acid, ethyl ester (VI) and acetic anhydride.

Following the procedure of Examples 18 and 19, but substituting appropriate starting materials, products having the following substituents may be prepared.

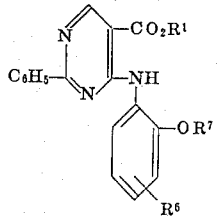

(XI)

| Example | $R^1$ | $R^6$ | $R^7$ |
|---|---|---|---|
| 18 | $C_2H_5$ | H | acetyl |
| 19 | $C_2H_5$ | Cl | acetyl |
| 20A | $CH_3$ | H | acetyl |
| B | $i$-$C_3H_7$ | H | acetyl |
| C | $C_4H_9$ | H | acetyl |
| D | $t$-$C_4H_9$ | H | acetyl |
| E | $CH_3$ | H | propionyl |
| F | $C_3H_7$ | Cl | butyryl |
| G | $C_4H_9$ | F | formyl |
| H | $C_4H_9$ | Cl | formyl |

EXAMPLE 20

The following exemplifies the preparation of o-N-acetylaminophenol, acetate, a compound of structure XIV.

To a pyridine solution (40 ml) containing 9.6 g of o-aminophenol (9.6 g) was added slowly 19.8 g of acetic anhydride whereby an exothermic reaction took place. When the reaction was subsided, the reaction mixture was heated on a steam bath for 0.5 hr, then chilled in a freezer. A precipitate thus separated was collected on a filter and washed with water to give 12.4 g of product, mp 122°–125°.

Following the procedure of Example 20, but substituting the appropriate starting materials, products having the following substituents may be prepared.

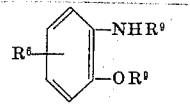

(XIV)

| Example | $R^6$ | $R^9$ |
|---|---|---|
| -A | H | acetyl |
| B | Cl | formyl |
| C | F | propionyl |
| D | Br | butyryl |

EXAMPLE 21

The following exemplifies the preparation of 2-N-ethylaminophenol, a compound of structure XV.

To a suspension of lithium aluminum hydride (2.48 g) in 35 ml of tetrahydrofuran was added dropwise o-N-acetylaminophenol, acetate (8.4 g) dissolved in 95 ml of tetrahydrofuran. The resulting mixture was stirred for 2 hr, then treated with 2.5 ml of water, 2.5 ml of 15 percent NaOH, and 7.5 ml of water successively. After removing inorganic salt by filtration, the tetrahydrofuran was evaporated under reduced pressure. Acidification of the residue with 3 N HCl caused separation of a precipitate which was collected on a filter under nitrogen atmosphere, and used directly in the following step.

Following the procedure of Example 21, but substituting appropriate starting materials, products having the following substitutents may be prepared.

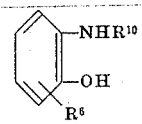

(XV)

| | $R^{10}$ | $R^6$ |
|---|---|---|
| Example 22-A | $C_2H_5$ | H |
| B | $CH_3$ | H |
| C | $C_3H_7$ | H |
| D | $n$-$C_4H_9$ | H |
| E | $CH_3$ | I |
| F | $C_2H_5$ | Br |
| G | $C_3H_7$ | F |
| H | $C_4H_9$ | Cl |

EXAMPLE 22

The following exemplifies the preparation of 4-(o-ethylaminophenoxy)-2-phenyl-5-pyrimidinecarboxylic acid, ethyl ester, a compound of structure XVI.

To an ethanolic solution containing o-ethylaminophenol obtained from o-N-acetylaminophenol, acetate (XIV) (44.5 g) in 70 ml of absolute ethanol was added in small portions 15 g of 4-chloro-2-phenyl-5-pyrimidinecarboxylic acid, ethyl ester (IV) with warming on a steam bath. The resulting mixture was refluxed for 45 min. Addition of a large amount of water caused separation of a precipitate which was collected on a filter and washed with water then with ether to give 23 g of product, mp 165°–167°.

Anal. Calcd for $C_{21}H_{21}N_3O_3$: C, 69.40; H, 5.83; N, 11.56.

Found: C, 69.28; H, 5.94; N, 11.57.

When tested in the foregoing pharmacological evaluation, the latter compound caused decreased motor activity at a dose of 127 MPK administered parenterally and decreased respiration at a dose of 127 MPK administered parenterally.

Following the procedure of Example 22 but substituting appropriate starting materials, products having the following substituents may be prepared.

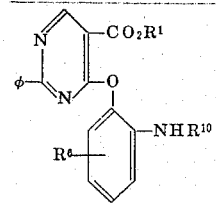

(XVI)

| | $R^1$ | $R^6$ | $R^{10}$ |
|---|---|---|---|
| Example 23-A | ethyl | H | ethyl |
| B | methyl | H | methyl |
| C | propyl | H | propyl |
| D | butyl | H | butyl |
| E | methyl | Cl | ethyl |
| F | ethyl | Cl | propyl |
| G | isopropyl | Cl | butyl |
| H | tert-butyl | Cl | methyl |
| I | ethyl | Br | methyl |
| J | propyl | F | butyl |
| K | ethyl | I | ethyl |

EXAMPLE 23

The following exemplifies the preparation of 4-(N-ethyl-o-hydroxyanilino)-2-phenyl-5- pyrimidinecarboxylic acid, a compound of structure XVII.

A mixture of 4-(o-ethylaminophenoxy)-2-phenyl-5-pyrimidinecarboxylic acid, ethyl ester (XVI) (7.0 g), 15 percent aqueous sodium hydroxide solution (50 ml), and ethanol (20 ml) was refluxed for 1.5 hr, then acidified with dilute HCl to about pH 2. A precipitate thus deposited was collected on a filter and washed with ethanol, then with water to give 6.1 g of product which melted at 150°–174°. Recrystallization from ethanol-water afforded a sample which melted at 150°–154°, solidified and remelted at 190°.

Anal. Calcd for $C_{19}H_{17}N_3O_3$: C, 68.05; H, 5.11; N, 12.53.

Found: C, 67.50; H, 5.03; N, 12.39.

EXAMPLE 24

The following exemplifies the preparation of 4-(2-methoxyanilino)-2-phenyl-5-pyrimidinecarboxylic acid, ethyl ester, a compound of structure XIV.

A mixture of 4-chloro-2-phenyl-5-pyrimidinecarboxylic acid, ethyl ester (5.0 g), o-anisidine (12.0 g), sodium carbonate (2.1 g), and absolute ethanol (40 ml) was refluxed for 2 hr. Chilling of the reaction mixture caused separation of a precipitate which was collected on a filter and washed with water to give 5.7 g of product. Recrystallization from absolute ethanol afforded an analytical sample, mp 145°–148°.

Anal. Calcd for $C_{20}H_{19}N_3O_3$: C, 68.75; H, 5.48; N, 12.03.

Found: C, 68.69; H, 5.54; N, 11.98.

EXAMPLE 25

The following exemplifies the preparation of 4-(N-ethyl-o-methoxyanilino)-2-phenyl-5-pyrimidinecarboxylic acid, ethyl ester, a compound of structure XIV.

A mixture of 4-chloro-2-phenyl-5-pyrimidinecarboxylic acid, ethyl ester (14 g), N-ethyl-o-methoxyaniline which was obtained from o-methoxyacetanilide (27 g) by Lithium aluminum hydride reduction, sodium bicarbonate (4.2 g), and ethanol (30 ml) was heated on a steam bath for 2 hr, then refluxed for 1 hr. Addition of a large amount of water caused separation of an oil. Purification of the oil by a fractional recrystallization from absolute ethanol afforded 9.7 g of product, mp 98°–100.5°.

Anal. Calcd for $C_{22}H_{23}N_3O_3$: C, 70.01; H, 6.14; N, 11.13

Found: C, 70.14; H, 6.34; N, 11.01.

When tested in the foregoing pharmacological evaluation, the latter compound caused decreased motor activity at a dose of 127 MPK administered parenterally.

Following the procedure of Example 25, but substituting appropriate starting materials, products having the following substituents may be prepared.

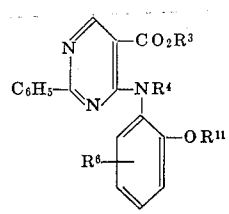

(XVII)

|  | $R^3$ | $R^{10}$ | $R^6$ | $R^{11}$ |
|---|---|---|---|---|
| Example 24 | H | $C_2H_5$ | H | H |
| 25-A | $C_2H_5$ |  | H | $CH_3$ |
| B | $CH_3$ | $CH_3$ | H | $CH_3$ |
| C | $C_3H_7$ | $C_3H_7$ | H | $C_3H_7$ |
| D | $C_4H_9$ | $C_4H_9$ | H | $C_4H_9$ |
| E | $C_2H_5$ | H | H | $CH_3$ |
| F | $C_2H_5$ | $C_2H_5$ | Cl | $CH_3$ |
| G | i-$C_3H_7$ | $C_2H_5$ | F | $CH_3$ |
| H | t-$C_4H_9$ | $CH_3$ | I | $C_2H_5$ |

EXAMPLE 26

The following exemplifies the preparation of 11-ethyl-2-phenylpyrimido[5,4-c][1,5]benzoxazepin-5(11H)-one, a compound of structure XVIII.

A mixture of 4-(N-ethyl-o-hydroxyanilino)-2-phenyl-5-pyrimidinecarboxylic acid (4.0 g) (XVII) and acetic anhydride (100 ml) was refluxed for 3 hr. Removal of the excess acetic anhydride under reduced pressure afforded an oil which solidified on standing to give 3.1 g of product, mp 130°–133°. Recrystallization from absolute ethanol raised the mp to 133°–134°.

Anal. Calcd for $C_{19}H_{15}N_3O_2$: C, 71.91; H, 4.76; N, 13.24.

Found: C, 71.90; H, 4.91; N, 13.62.

When tested in the foregoing pharmacological evaluation, the latter compound caused decreased motor activity at a dose of 400 MPK administered parenterally and decreased respiration at a dose of 400 MPK administered parenterally.

Following the procedure of Example 26, but substituting appropriate starting materials, products having the following substituents may be prepared.

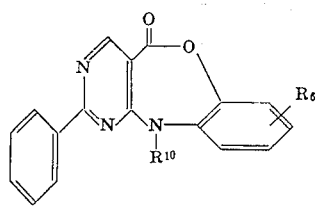

(XVIII)

|  | $R^6$ | $R^{10}$ |
|---|---|---|
| Example 26-A | H | ethyl |
| B | H | methyl |
| C | H | propyl |
| D | H | butyl |
| E | Cl | ethyl |
| F | Cl | methyl |
| G | Cl | isopropyl |
| H | Cl | butyl |
| I | Br | ethyl |
| J | F | propyl |
| K | I | methyl |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from those having the structural formula

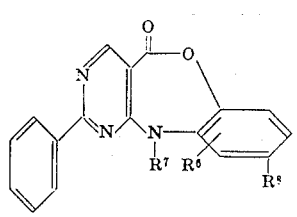

wherein

R⁶ is hydrogen, halogen, or nitro;

R⁷ is lower alkyl or lower alkanoyl; and

R⁸ is hydrogen, halogen or nitro.

2. A compound as defined in claim 1 which is 11-ethyl-2-phenylpyrimido[5,4-c][1,5]benzoxazepin-5(11H)-one.

3. A compound as defined in claim 1 which is 11-acetyl-2-phenylpyrimido[5,4-c][1,5]benzoxazepin-5(11H)-one.

4. A compound as defined in claim 1 which is 11-acetyl-9-chloro-2-phenylpyrimido[5,4-c][1,5]benzoxazepin-5(11H)-one.

5. A compound as defined in claim 1 which is 11-acetyl-9-nitro-2-phenylpyrimido[5,4-c][1,5]benzoxazepin-5(11H)-one.

* * * * *